US011180399B2

(12) United States Patent
Ren et al.

(10) Patent No.: US 11,180,399 B2
(45) Date of Patent: Nov. 23, 2021

(54) INTELLIGENT OIL SLUDGE TREATMENT APPARATUSES AND TREATMENT PROCESSES

(71) Applicant: PANJIN NEWTIDE ENERGY TECHNOLOGY CO., LTD., Panjin (CN)

(72) Inventors: Jie Ren, Panjin (CN); Xiuwen Wang, Panjin (CN); Ying Liang, Panjin (CN); Zhengguo Shi, Panjin (CN); Hongmei Zhang, Panjin (CN); Wang Huo, Panjin (CN); Wei Wang, Panjin (CN); Ge Li, Panjin (CN); Geng Wang, Panjin (CN); Changkun Zhou, Panjin (CN); Yuting Shao, Panjin (CN); Bo Li, Panjin (CN); Rui Wang, Panjin (CN); Peng Chen, Panjin (CN)

(73) Assignee: PANTIN NEWTIDE ENERGY TECHNOLOGY CO., LTD., Panjin (CN)

( * ) Notice: Subject to any disclaimer, the term of this patent is extended or adjusted under 35 U.S.C. 154(b) by 0 days.

(21) Appl. No.: 16/641,023

(22) PCT Filed: May 27, 2019

(86) PCT No.: PCT/CN2019/088524
§ 371 (c)(1),
(2) Date: Feb. 21, 2020

(87) PCT Pub. No.: WO2020/029653
PCT Pub. Date: Feb. 13, 2020

(65) Prior Publication Data
US 2021/0163326 A1    Jun. 3, 2021

(30) Foreign Application Priority Data
Aug. 4, 2018 (CN) .......................... 201810880719.7

(51) Int. Cl.
*C02F 9/00* (2006.01)
*B01D 5/00* (2006.01)
(Continued)

(52) U.S. Cl.
CPC ................ *C02F 9/00* (2013.01); *B01D 5/006* (2013.01); *B01D 5/009* (2013.01); *B01D 5/0093* (2013.01);
(Continued)

(58) Field of Classification Search
USPC ........... 208/347, 370; 202/96; 210/623, 703, 210/696; 201/23; 196/14.52, 98, 155
See application file for complete search history.

(56) References Cited

U.S. PATENT DOCUMENTS 6,120,680 A *  9/2000  Campbell .............. B01D 17/00
                                                   208/428
8,101,812 B2 *  1/2012  Fan .......................... C10G 1/04
                                                   585/867

(Continued)

FOREIGN PATENT DOCUMENTS

CN    102503055 B  *  5/2014
CN    104876406 B  *  12/2016
KR    20120084226 A  *  7/2012

OTHER PUBLICATIONS

English Translation CN 10253055-B (Year: 2014).*
English Translation CN 104876406-B Dec. 2016 (Year: 2016).*
English Translation KR-20120084226 Jul. 2012 (Year: 2012).*

*Primary Examiner* — Nina Bhat
(74) *Attorney, Agent, or Firm* — Dragon Sun Law Firm, PC; Jinggao Li, Esq.

(57) ABSTRACT

The present invention relates to intelligent oil sludge treatment apparatuses and treatment processes. The treatment apparatus includes an integrative device, an oil removal device, a separation device, a sludge collection tank, a (Continued)

dewatering device, a pyrolysis device, an agent tank, a deodorization tower, a crude oil tank, a light oil tank, a separator, a condenser, a desulfurization tower, a clean water tank, a sewage station, and a steam boiler, where an outlet of the integrative device is connected to an inlet of the oil removal device; the oil removal device is configured to remove crude oil from oil slurry; the oil removal machine collects the crude oil to the crude oil tank, discharges stench into the deodorization tower, and discharges the slurry into the separation device; and the separation device is configured to perform a solid-liquid separation operation.

10 Claims, 1 Drawing Sheet

(51) Int. Cl.
| | |
|---|---|
| *C10G 1/00* | (2006.01) |
| *B01D 17/02* | (2006.01) |
| *B01D 17/04* | (2006.01) |
| *B01D 21/00* | (2006.01) |
| *C02F 1/00* | (2006.01) |
| *C10G 33/04* | (2006.01) |
| *C10G 33/06* | (2006.01) |
| *C02F 11/13* | (2019.01) |
| *C02F 1/24* | (2006.01) |
| *C02F 1/40* | (2006.01) |
| *C02F 11/10* | (2006.01) |
| *C02F 11/127* | (2019.01) |
| *C02F 11/14* | (2019.01) |
| *C02F 11/18* | (2006.01) |
| *C02F 101/32* | (2006.01) |
| *C02F 103/10* | (2006.01) |

(52) U.S. Cl.
CPC ....... *B01D 17/0205* (2013.01); *B01D 17/047* (2013.01); *B01D 21/0027* (2013.01); *C02F 1/008* (2013.01); *C10G 1/002* (2013.01); *C10G 33/04* (2013.01); *C10G 33/06* (2013.01); *C02F 1/24* (2013.01); *C02F 1/40* (2013.01); *C02F 11/10* (2013.01); *C02F 11/127* (2013.01); *C02F 11/13* (2019.01); *C02F 11/14* (2013.01); *C02F 11/18* (2013.01); *C02F 2001/007* (2013.01); *C02F 2101/32* (2013.01); *C02F 2103/10* (2013.01); *C02F 2209/02* (2013.01); *C02F 2303/02* (2013.01); *C10G 2300/1003* (2013.01); *C10G 2400/02* (2013.01); *C10G 2400/04* (2013.01)

(56) References Cited

U.S. PATENT DOCUMENTS

2015/0336022 A1* 11/2015 Topping ................ F23G 7/001
    201/3
2016/0045841 A1*  2/2016 Kaplan .................. B01D 3/06
    429/49

* cited by examiner

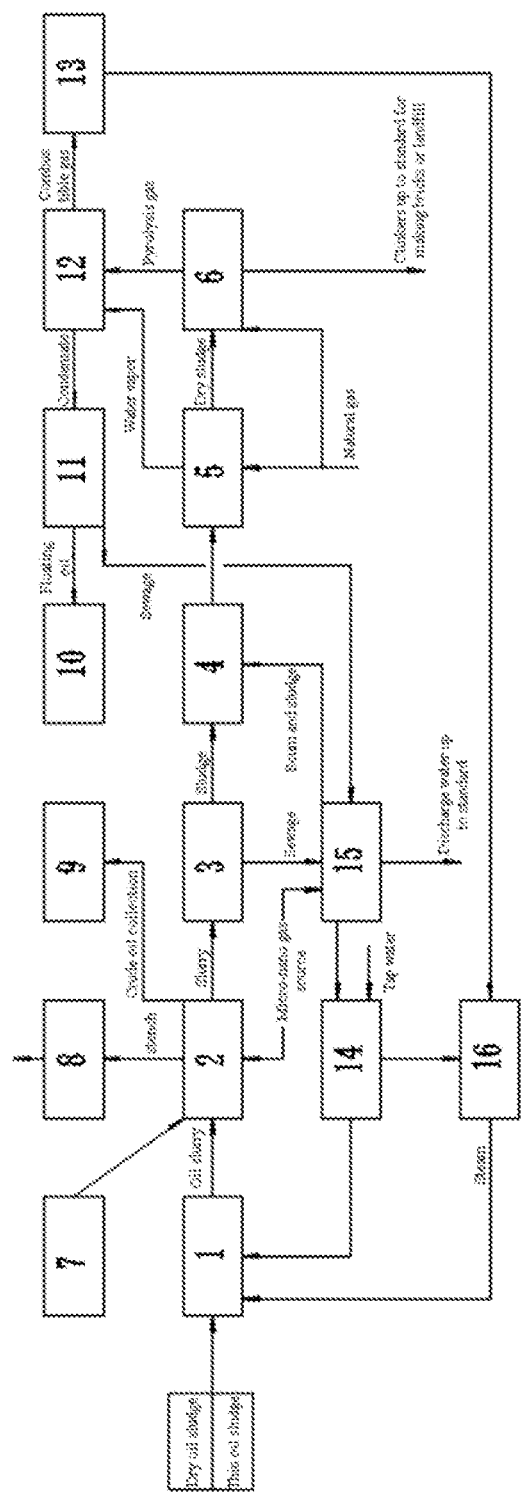

INTELLIGENT OIL SLUDGE TREATMENT APPARATUSES AND TREATMENT PROCESSES

REFERENCE TO RELATED APPLICATIONS

This application claims the benefits of the filing dates of Chinese patent application Serial No. CN2018/10880719.7, filed on Aug. 4, 2018 and PCT Patent Application Serial No. PCT/CN2019/088524 filed on May 27, 2019, entitled "INTELLIGENT OIL SLUDGE TREATMENT APPARATUSES AND TREATMENT PROCESSES". The teachings of the entire referenced applications are incorporated herein by reference.

TECHNICAL FIELD

The present invention relates to the technical field of solid waste treatment of oily sludge from oilfields, and specifically, to intelligent oil sludge treatment apparatuses and treatment processes. The treatment apparatuses and treatment processes use scientific formulations, integrative equipment and intelligent means, have advantages of high efficiency and cost saving, and provide a new solution for the field of solid waste treatment.

BACKGROUND

Oil sludge is generated in the process of petroleum exploitation, transportation, refining and oily sewage treatment, and is a multiphase system composed of water, petroleum hydrocarbons, solid sediment, woven bags, and many kinds of impurities. The annual production of oil sludge in domestic oilfields is very large, accounting for about 2 percent of the total crude oil production; and the composition of the oil sludge is extremely complex, and a large amount of toxic substances, including chemical substances, bacteria, woven bags, brick tiles and so on, are contained.

With the continuous exploitation of petroleum resources, various additives continuously increase during the petroleum exploitation, resulting in a wider variety of components of the oil sludge and corresponding changes in treatment processes. There are about seven or eight kinds of oil sludge treatment processes with respective characteristics. It is difficult to meet stringent environmentally-friendly requirements simply by processes and technologies.

For the oil sludge generated in the oilfields, the treatment methods used at home and abroad mainly include: biodegradation method, solvent extraction method, incineration method, washing method, landfill method. However, these methods can only achieve reduction in amount, and the problem of pollution of oil sludge still cannot be fundamentally solved. In addition, the equipment used in almost all the treatment methods is basically operated manually, the degree of refinement and intelligence is very low; moreover, the sources of the oil sludge are different, and the types are also different; therefore, it is necessary to use suitable processes to treat different types of oil sludge.

In order to change the extensive operation of the oil sludge market and achieve the goal of harmless treatment and recycling of oil sludge, the present invention develops integrating treatment processes for various types of oil sludge to achieve the purposes of harmlessness, recycling, cost saving, practicability, environmental protection, and standardization.

SUMMARY

In order to solve the aforementioned technical problems, the present invention provides intelligent oil sludge treatment apparatuses and treatment processes, which overcome the deficiencies of the prior art, utilizes scientific formulations, integrative equipment, intelligent means, can achieve the effect of high efficiency and cost saving, can treat different types of oil sludge in a specialized manner and implement the integrating treatment process of slurry making of oil sludge, oil removal, separation, pyrolysis, and brick making using clinkers, so as to achieve the purposes of harmless treatment and recycling of oil sludge.

In order to achieve the purposes above, the technical solution of the present invention is as follows.

The present invention provides an intelligent oil sludge treatment apparatus, including: an integrative machine, an oil removal machine, a separation machine, a sludge collection tank, a dewatering machine, a pyrolysis machine, an agent tank, a deodorization tower, a crude oil tank, a light oil tank, a separator, a condenser, a desulfurization tower, a clean water tank, a sewage plant, and a steam boiler, where an outlet of the integrative machine is connected to an inlet of the oil removal machine; the oil removal machine is configured to remove crude oil from oil slurry; the oil removal machine collects the crude oil to the crude oil tank, discharges the stench into the deodorization tower, and discharges the slurry into the separation machine; the agent tank is connected to the oil removal machine; the separation machine is configured to perform a solid-liquid separation operation, to discharge the sludge into the sludge collection tank, and to discharge the sewage into the sewage plant; the sludge collection tank is configured to temporarily store sediment from the separation machine and to feed the dewatering machine; the dewatering machine is configured to evaporate water and then same convey into the condenser, and to convey dry sludge into the pyrolysis machine; the pyrolysis machine is configured to convey pyrolysis gas into the condenser; the condenser is configured to discharge a condensate into the separator; the outlet of the separator is connected to the sewage plant and the light oil tank, separately; an inlet of the desulfurization tower is connected to the condenser, and an outlet thereof is connected to the steam boiler; the clean water tank is configured to provide a water source for the integrative machine and the steam boiler; and the steam boiler provides a heat source for the integrative machine and the oil removal machine.

The integrative machine includes a drum assembly, a feed hopper, an electric motor, and a steam pipeline; a slurry pool is provided at a lower portion of the integrative machine; an air flotation member and a steam member are provided at the bottom in the slurry pool; a drive system is provided at an upper portion; the drum assembly is disposed above the drive system; a front half of a drum is a slurry making section, and a rear half thereof is a screening and cleaning section; a steam spray and cleaning device is further provided at a middle portion; and a hot water pipeline and a steam pipeline are mounted next to the slurry pool.

The oil removal machine includes a tank body, an electric oil collection device, a wind-driven oil-blowing device, a temperature sensor, an interface meter, an air floatation member, a three-phase agent addition device, and a micro-nano bubble generator; the air floatation member and the steam member are provided at the bottom in the tank body; the interface meter and the electric oil collection device are mounted at the top of the oil removal machine; the wind-driven oil-blowing device is disposed between a tail end of the oil removal machine and the electric oil collection device; a remote temperature sensor is mounted on a side face thereof; an inlet of the air floatation member is connected to an air supply device and the micro-nano bubble generator; an inlet of the steam member is connected to the steam boiler; an outlet of the electric oil collection device is connected to the crude oil tank; an outlet of the air supply device is connected to the deodorization tower; and the oil removal machine is connected to the agent tank by means of an inlet of an agent pipeline.

The separation machine consists of a flocculation zone, a sedimentation zone, a sediment collection zone, an extrusion pusher, and a high-speed centrifuge; after the sludge after oil removal is mixed with a flocculant in the flocculation zone, a solid substance sinks under the action of gravity, and the water is discharged along an upper outlet; the sediment at the bottom is pushed by a screw feeder into the high-speed centrifuge; and under the action of the high-speed centrifuge, the water in the sediment is further removed, and the remaining sludge is conveyed to the sludge collection tank.

The sludge collection tank is configured to temporarily store sediment from the separation machine; during movement from an outlet of the centrifuge to the sludge collection tank, the sediment is added quantitatively with a dispersant and mixed with the dispersant so as to prevent the sludge entering the sludge collection tank 4 from easily agglomerating; and the screw feeder is disposed at the bottom of the sludge collection tank, is configured to feed the dewatering machine 5, and is in a sealed connection transmission with the dewatering machine 5 and the pyrolysis machine 6 by means of a discharge screw at the bottom of the sludge collection tank.

The dewatering machine consists of a burner and a heat exchanger; the fuel of the burner is pipeline natural gas; the heat exchanger is provided with a screw shaft for moving and tumbling the sediment; and the working temperature in the heat exchanger of the dewatering machine is between 200° C. and 300° C.

The pyrolysis machine is provided with a burner and a heat exchanger, and the working temperature in the heat exchanger of the pyrolysis machine is between 550° C. and 650° C.

A demulsifier, a flocculant, a dispersant, and/or a curing agent are stored inside the agent tank, respectively.

A spray device is provided inside the deodorization tower; a sodium hydroxide alkali solution is stored in the spray device; the spray device is connected to an alkali solution pump and a circulation pipeline externally; and a lower portion of the deodorization tower is provided with a stench inlet, and the top thereof is provided with an air outlet.

The crude oil tank is configured to store crude oil separated by the oil removal machine; the light oil tank is configured to store gasoline and/or diesel separated by the separator; a visible level gauge is provided in the separator; a condensate inlet is provided at an upper portion of the separator, and an outlet is provided at the bottom; and the outlet is connected to the sewage plant and the light oil tank, separately.

The condenser includes a dust removal device, a condensation device, and a buffer water tank; and steam from the dewatering machine and pyrolysis gas discharged from the pyrolysis machine enter the condenser and pass through the dust removal device and the condensation device in sequence, so that the a liquefiable substance falls into the buffer water tank, and the gas that cannot be liquefied is conveyed to the desulfurization tower.

A desulfurizer is distributed in the desulfurization tower; a combustible gas inlet is provided at the bottom of the desulfurization tower, and a combustible gas outlet is provided at the top thereof; the combustible gas inlet is connected to the condenser; and the combustible gas outlet is connected to the steam boiler.

A treatment process of the intelligent oil sludge treatment apparatus of the present invention is as follows:

an oil sludge material is fed by means of a hopper of an integrative machine; according to a water content of a raw material and a dissolution temperature of oil, hot water at a certain temperature is added to the hopper and mixed with the oil sludge material in the hopper, and then the mixture falls into a rotating roller screen; after being cut, crushed, and stirred by blades in a front half section of the roller screen, oil sludge and water are fully mixed to form oil slurry; the oil slurry and impurities are transitioned to a rear half screening section under the push of a discharge screw; the oil slurry passes through the screen and falls into a slurry pool below; large particles failed to pass through are carried forward, are flushed by means of steam spray, are crushed after falling into a crusher, and then return to the hopper to prepare the slurry again;

the oil slurry prepared by the integrative machine enters an oil removal machine under the push of a pump for an oil removal operation; according to the properties of the oil sludge and the working temperature of a demulsifier, the oil slurry in the oil removal machine is heated by a steam member; the steam heating is stopped when a set temperature is reached; the demulsifier is injected quantitatively by means of a three-phase agent addition device; a micro-nano gas source is introduced for stirring; after stirring uniformly, the gas supply is stopped, and the oil slurry stands still; without interference from an external force, under a cracking action of the demulsifier and micro-nano bubbles, a water-in-oil structure is crushed, and the oil, water, and sediment respectively enter a free state; the micro-nano bubbles are adsorbed on surfaces of crude oil particles to increase the buoyancy of heavy crude oil and float up to the surface of water together with the crude oil; the sediment sinks under the action of gravity, so that an oil content of the oil sludge is reduced to 3 percent to 5 percent after treatment from 10 percent to 30 percent before treatment;

stench generated when the oil sludge is heated by the oil removal machine is collectively extracted and conveyed to a deodorization tower for treatment and then discharged after reaching the standard;

after the oil is collected by the oil removal machine, the remaining water and sediment are discharged into the separation machine; an air flotation member is started to stir the sediment at the bottom of the pool using high-pressure gas, so as to form a suspension liquid with water, and then the suspension liquid is conveyed to the separation machine by the pump to perform a solid-liquid separation operation;

after the sludge after oil removal is mixed with the flocculant in the separation machine, the solid substance sinks under the action of gravity, and the water is discharged along an upper outlet; the sediment at the lower portion is pushed by a screw feeder into a centrifuge, under the action of the high-speed centrifuge, the water in the sediment is further removed, and the remaining sludge is conveyed to the sludge collection tank; the water is discharged from a water outlet to a sewage plant;

during movement from the outlet of the centrifuge to the sludge collection tank, the sludge is added with a dispersant quantitatively and mixed with the dispersant so as to prevent the sludge entering the sludge collection tank from easily agglomerating; the screw feeder at the bottom is configured to feed the sludge to the dewatering machine quantitatively and is in a sealed connection transmission with the dewatering machine and the pyrolysis machine by means of a discharge screw at the bottom of the sludge collection tank;

the working temperature in the heat exchanger of the dewatering machine is between 200° C. and 300° C., so that the water in the oil sludge is evaporated, and the water content of the dried oil sludge is reduced by 30 percent to 50 percent; the water in the oil sludge is evaporated and conveyed to the condenser; the dry sludge enters the pyrolysis machine for pyrolysis;

the working temperature in the heat exchanger of the pyrolysis machine is between 550° C. and 650° C.; the grease, moisture and/or plastic in the sludge entering the pyrolysis machine are vaporized and evaporated, and are conveyed to the condenser by means of pipelines, and after reaching the standard, the remaining clinkers are mixed with a curing agent and then coagulate for making bricks; and the crude oil separated by the oil removal machine is stored in the crude oil tank; gasoline and/or diesel oil separated by the separator is stored in a light oil tank; and the sewage separated by the separator is conveyed to the sewage plant.

Compared to the prior art, the technical solution of the present invention has the following advantages:

In the present invention, in order to overcome the deficiencies of the prior art, a series of supporting agent formulations are selected for the properties of different types of oily sludge; the functions of crushing, slurry making, screening, and cleaning of oil sludge are replaced with an integrative machine; the rate of oil removal of oil sludge is increased by using a chemical agent assisting with micro-nano bubbles, thereby greatly reducing the use amount of the chemical agent; the oil is accurately collected by the intelligent visible electric oil collection device, thereby improving the collection rate of the crude oil; the mode combining the dewatering machine and pyrolysis machine reduces fuel consumption, increases the treatment amount of oil sludge, and enables the entire process to operate on a large scale. In addition, the supporting condenser, deodorization tower, desulfurization tower, and sewage plant can enable the gas, water and clinkers to be discharged after reaching the standard, so that the effect of harmless treatment and recycling of the oil sludge is truly achieved.

BRIEF DESCRIPTION OF THE DRAWINGS

In order to make the content of the present invention easier understood, the present invention is further described in detail below in combination with the specific embodiments and accompanying drawings of the present invention.

FIG. 1 is a process flow chart of the present invention;

In the drawing, 1-integrative machine, 2-oil removal machine, 3-separation machine, 4-sludge collection tank, 5-dewatering machine, 6-pyrolysis machine, 7-agent tank, 8-deodorization tower, 9-crude oil tank, 10-light oil tank, 11-separator, 12-condenser, 13-desulfurization tower, 14-clean water tank, 15-sewage plant, and 16-steam boiler.

DETAILED DESCRIPTION

The intelligent oil sludge treatment apparatus of the present invention includes an integrative machine 1, an oil removal machine 2, a separation machine 3, a sludge collection tank 4, a dewatering machine 5, a pyrolysis machine 6, an agent tank 7, a deodorization tower 8, a crude oil tank 9, a light oil tank 10, a separator 11, a condenser 12, a desulfurization tower 13, a clean water tank 14, a sewage plant 15, and a steam boiler 16; where an outlet of the integrative machine 1 is connected to an inlet of the oil removal machine 2; the oil removal machine 2 is configured to remove crude oil from oil slurry; the oil removal machine collects the crude oil to the crude oil tank 9, discharges stench into the deodorization tower 8, and discharges the slurry into the separation machine 3; the agent tank 7 is connected to the oil removal machine 2; the separation machine 3 is configured to perform a solid-liquid separation operation, to discharge the sludge into the sludge collection tank 4, and to discharge the sewage into the sewage plant 15; the sludge collection tank 4 is configured to temporarily store sediment from the separation machine 3 and to feed the dewatering machine 5; the dewatering machine 5 is configured to evaporate water and convey the water into the condenser 12, and to convey dry sludge into the pyrolysis machine 6; the pyrolysis machine 6 is configured to convey pyrolysis gas into the condenser 12; the condenser 12 is configured to discharge a condensate into the separator 11; an outlet of the separator 11 is connected to the sewage plant 15 and the light oil tank 10, separately; an inlet of the desulfurization tower 13 is connected to the condenser 12, and an outlet thereof is connected to the steam boiler 16; the clean water tank 14 is configured to provide a water source for the integrative machine 1 and the steam boiler 16; and the steam boiler 16 provides a heat source for the integrative machine and the oil removal machine 2.

The integrative machine 1 has the functions of crushing, cutting, slurry making, screening, cleaning, heating, etc., and is applicable to different sources of the oil sludge regardless of water/oil content and particle size. The integrative machine consists of a drum assembly, a feed hopper, an electric motor, and a steam pipeline; a slurry pool is provided at a lower portion of the integrative machine 1; an air flotation member and a steam member are provided at the bottom in the slurry pool; a drive system is provided at an upper portion; the drum assembly is disposed above the drive system; a front half of a drum is a slurry making section, and a rear half thereof is a screening and cleaning section; a steam spray and cleaning device is further provided at a middle portion; and a hot water pipeline and a steam pipeline are mounted next to the slurry pool.

The drum assembly is designed as a horizontal structure; the inner wall of the drum is provided with a discharge screw and cutting blades; the electric motor drives the drum to rotate so as to puncture and cut impurities, such as plastic cloth and woven bags, in the oil sludge by means of the up-and-down rotary movements of the blades; and non-recyclable large pieces in the oil sludge are discharged from the other end of the drum, and the slurry is filtered by the pores of the drum and enters the slurry pool below.

In the slurry making section of the drum, hot water at a temperature of 70° C. to 90° C. is injected by means of a valve, and the oil sludge is diluted, heated, and stirred in the drum so as to fully mix the oil sludge with water to obtain flowable oily sludge.

In the screening and cleaning section of the drum, steam is injected by means of a valve to heat the impurities in the oil sludge that are continuously turned over, stirred and impacted under the action of the drum, so that the stable oil adsorbed on the surfaces of the impurities is separated maximally.

The integrative machine works as follows. Due to the complex composition of the oil sludge, both thick oil sludge and thin oil sludge can be fed by means of the hopper of the integrative machine; according to a water content of a raw material and a dissolution temperature of oil, hot water at a certain temperature is added to the hopper and mixed with the raw material in the hopper, and then the mixture falls into a rotating roller screen. After being cut, crushed, and stirred by blades in a front half section of roller screen, the oil sludge and water are fully mixed to form oil slurry. The oil slurry and impurities are transitioned to a rear half screening section under the push of the discharge screw; the oil slurry passes through the screen and falls into the slurry pool below, and large particles failed to pass through are carried forward, are flushed by means of steam spray, are crushed after falling into a crusher, and then return to the hopper to prepare the slurry again. The function of the oil removal machine 2 is to remove crude oil from the oil sludge. In order to achieve the purpose, the oil removal machine includes a tank body, an electric oil collection device, a wind-driven oil-blowing device, a temperature sensor, an interface meter, an air floatation member, a three-phase agent addition device, and a micro-nano bubble generator; the air floatation member and a steam member are provided at the bottom in the tank body; the interface meter and the electric oil collection device are mounted at the top of the oil removal machine; the wind-driven oil-blowing device is disposed between the tail end of the oil removal machine and the electric oil collection device; a remote temperature sensor is mounted on a side face thereof; an inlet of the air floatation member is connected to an air supply device and the micro-nano bubble generator; an inlet of the steam member is connected to the steam boiler 16; an outlet of the electric oil collection device is connected to the crude oil tank 9; the outlet of the air supply device is connected to the deodorization tower 8; and the oil removal machine is connected to the agent tank 7 by means of an inlet of an agent pipeline.

The interface meter mounted at the top of the oil removal machine can monitor the change of the oil sludge in the oil removal machine 2 in real time; the change process of the oil sludge from a turbid state to a layering state can be clearly seen through the screen of a central control room; the specific oil-water interface and water-slurry interface are specifically indicated with elevation levels. When the layering is clear, the electric oil collection device can be started to collect oil at the oil-water interface.

When the oil film on the water surface is thin and difficult to collect at the later stage of the oil collection, the wind-driven oil-blowing device is started to blow the oil on the water surface into an oil collector. The collected crude oil is conveyed to the crude oil tank through a pump for storage.

The micro-nano bubble generator is a gas-liquid hybrid type micro-nano bubble generator; the gas-liquid mixed fluid entering the micro-nano bubble generator rotates at a high speed under pressure to generate high-speed and strong shear and high-frequency pressure fluctuations between the gas-liquid contact interface, so that, under such conditions, a large amount of micro- and nano-sized bubbles are generated to break up molecular clusters and to form active water with small molecular groups, a small portion of water molecules can be ionized and decomposed to generate, in the spaces of micro-nano bubbles, free radical ions such as active oxygen, oxygen ions, hydrogen ions, and hydroxide ions; especially, hydroxyl free radicals have ultra-high reduction potential and super-oxidizing effect, thus pollutants that are difficult to decompose under normal conditions in water may be decomposed.

The oil slurry prepared by the integrative machine has a water content of about 85 percent and has good fluidity. Under the push of a pump, the oil slurry enters the oil removal machine for the following oil removal operation. Firstly, according to the properties of the oil sludge and the working temperature of a demulsifier, the oil slurry in the oil removal machine is heated by the steam member; the steam heating is stopped when a set temperature is reached; the demulsifier is injected quantitatively by means of the three-phase agent addition device; a micro-nano gas source is introduced for stirring. After stirring uniformly, the gas supply is stopped, and the oil slurry stands still for about 1 h. Without interference from an external force, under the cracking action of the demulsifier and the micro-nano bubbles, the water-in-oil structure is crushed, and the oil, water, and sediment respectively enter a free state. Since the rising speed of the micro-nano bubbles in liquid is very slow, the micro-nano bubbles are adsorbed on the surfaces of the crude oil particles to increase the buoyancy of heavy crude oil and float up to the surface of water together with the crude oil, and the sediment sinks under the action of gravity. Thus, an oil content of the oil sludge is reduced to 3 percent to 5 percent after treatment from 10 percent to 30 percent before treatment.

A large amount of stench is generated when the oil sludge is heated by the oil removal machine, and in order not to pollute the ambient air, the stench is collectively extracted and conveyed to the deodorization tower for treatment and then discharged after reaching the standard.

After the oil is collected by the oil removal machine, the remaining water and sediment are discharged into the separation machine. In order to completely discharge the sediment at the bottom of the pool, the air flotation member is started at first to stir the sediment at the bottom of the pool using high-pressure gas, so as to form a suspension liquid with water, and then the suspension liquid is conveyed to the separation machine by a pump to perform a solid-liquid separation operation.

The separation machine 3 consists of a flocculation zone, a sedimentation zone, a sediment collection zone, an extrusion pusher, and a high-speed centrifuge. The sludge after oil removal is mixed with a flocculant in the separation machine, the solid substance sinks under the action of gravity, and the water is discharged along an upper outlet. The sediment at the bottom is pushed by a screw feeder into the high-speed centrifuge; and under the action of the high-speed centrifuge, the water in the sediment is further removed, and the remaining sludge is conveyed to the sludge collection tank 4.

The slurry is pushed into a rotary drum of the centrifuge by the screw feeder. Due to the high-speed rotation of the rotary drum having a particular pore size, the oil and water in the slurry in the rotary drum are thrown out of the rotary drum under a centrifugal force; the sediment particles remain in the rotary drum; under the action of centrifugal force, the sediment particles rotate at a high speed, so that the slurry is continuously screened in the centrifuge and automatically discharged, and the generated sediment enters the sludge collection tank.

The separation machine receives the slurry from the oil removal machine and mixes same with the flocculant from the agent tank to produce a solid-liquid separation operation effect. The sediment in the slurry sinks under the action of gravity, and the suspended particles which are not easy to sink also quickly agglomerate under the action of the flocculant and sink, and the clean water is discharged from an overflow port at an upper portion of the separation machine and conveyed to the sewage plant. The sediment and agglomerate particles sink to the collection zone at the bottom, and are pushed and extruded by the discharge screw at the bottom to enter the high-speed centrifuge; under the action of a strong centrifugal force, the solid substance is completely separated from liquid, the water is discharged from a water outlet to the sewage plant, and the sediment is conveyed from a sludge discharge port to the sludge collection tank.

The sludge collection tank 4 is configured to temporarily store the sediment from the separation machine 3; during the movement from the outlet of the centrifuge to the sludge collection tank, the sediment is added with a dispersant quantitatively and mixed with the dispersant so as to prevent the sludge entering the sludge collection tank 4 from easily agglomerating; the screw feeder disposed at the bottom of the sludge collection tank feeds the sediment to the dewatering machine 5 and is in a sealed connection transmission with the dewatering machine 5 and the pyrolysis machine 6 by means of a discharge screw at the bottom of the sludge collection tank, so that the air outside cannot enter, and the sludge is transported quantitatively.

The dewatering machine 5 consists of a burner and a heat exchanger. The fuel is pipeline natural gas. The heat exchanger is provided with a screw shaft for moving and tumbling the sediment. The working temperature in the heat exchanger is between 200° C. and 300° C. The water in the oil sludge is evaporated, and the water content of the dried oil sludge is reduced by 30 percent to 50 percent; pyrolysis is performed; the water in the oil sludge is evaporated and conveyed to the condenser 12; and the dry sludge enters the pyrolysis machine 6.

The pyrolysis machine 6 also consists of a burner and a heat exchanger, the fuel of the burner is also natural gas, and the heat exchanger is provided with a screw shaft. However, the working temperature in the heat exchanger of the pyrolysis machine is between 550° C. and 650° C. The grease, moisture, plastic, etc. in the sludge entering the pyrolysis machine are vaporized and evaporated, and are conveyed to the condenser 12 by means of pipelines, and after reaching the standard, the remaining clinkers are mixed with a curing agent and then coagulate for making bricks.

The pyrolysis machine works as follows: dry oily sludge enters the pyrolysis machine from a feed port and is treated at a temperature of 550° C. to 650° C. for 25 to 30 minutes; crude oil component contained in the oil sludge is separated, vaporized and volatilized at different temperatures, the generated pyrolysis gas mixture is conveyed to a condenser unit by means of a vacuum pump, the dry slag remained after pyrolysis is cooled by means of heat exchange and is pushed by a screw feed device into a discharge treatment unit from a discharge port. The content of hydrocarbon-containing components in the dry slag is less than or equal to 0.02 percent, which is higher than the requirement of less than or equal to 0.3 percent in the national standard "*Control Standards of Pollutants in Sludge for Agricultural Use*" (GB4284-1984). After reaching the standard, the remaining clinkers are mixed with a curing agent then coagulate and are used as material for making building materials such as bricks.

A demulsifier, a flocculant, a dispersant, a curing agent, etc. are stored inside the agent tank, respectively; the use amount of each agent is determined according to the properties of the oil sludge; and the agents are added to corresponding positions in a targeted manner according to the selected series of formulations.

The deodorization tower 8 is internally provided with a spray device, which contains a sodium hydroxide alkali solution and is connected to an alkali solution pump and a circulation pipeline externally. A lower portion of the deodorization tower is provided with a stench inlet, and the top thereof is provided with an air outlet.

The crude oil tank 9 is configured to store crude oil separated by the oil removal machine 2. After being treated by a crude oil dewatering device, the crude oil has a water content of less than 1 percent, and is discharged outward or enters an oil storage tank directly.

The light oil tank 10 is configured to store gasoline and/or diesel separated by the separator 11.

A visible level gauge is provided in the separator 11; a condensate inlet is provided at an upper portion of the separator, and an outlet is provided at the bottom; and the outlet is connected to the sewage plant 15 and the light oil tank 10, separately.

The condenser 12 consists of a dust removal device, a condensation device, a buffer water tank, etc. The steam from the dewatering machine 5 and the pyrolysis gas discharged from the pyrolysis machine 6 enter the condenser and pass through the dust removal device and the condensation device in sequence, so that the liquefiable substance falls into the buffer water tank, and the gas that cannot be liquefied is conveyed to the desulfurization tower 13.

A particular amount of desulfurizer is distributed in the desulfurization tower 13; a combustible gas inlet is provided at the bottom of the desulfurization tower, and a combustible gas outlet is provided at the top. The inlet is connected to the condenser 12; and the outlet is connected to the steam boiler 16.

The clean water tank 14 is mainly configured to store tap water or water up to the standard, and provides a water source for the integrative machine 1, the steam boiler 16, and other portions of the system.

The sewage plant 15 is a biological purification system, which mainly includes an operation room, a microbial agent culture tank, a microbial agent dilution tank, an aerobic tank, an activated sludge reflux tank, etc. A circulating pump and a micro-nano generator are provided in the operation room; and a sewage inlet and a clean water outlet are provided in the sewage plant.

The steam boiler 16 consists of a burner and a steam generator. The steam boiler is mainly configured to burn the combustible gas generated after pyrolysis, and the combustible gas is discharged after reaching the standard, and the heat generated by the combustion is converted into saturated steam so as to provide a heat source for the integrative machine and the oil removal machine 2.

A treatment process of the intelligent oil sludge treatment apparatus of the present invention is as follows:

an oil sludge material is fed by means of a hopper of an integrative machine; according to a water content of a raw material and a dissolution temperature of oil, hot water at a certain temperature is added to the hopper and mixed with the oil sludge material in the hopper, and then the mixture falls into a rotating roller screen; after being cut, crushed, and stirred by blades in a front half section of the roller screen, the oil sludge and water are fully mixed to form oil slurry; the oil slurry and impurities are transitioned to a rear half screening section under the push of the discharge screw; the oil slurry passes through the screen and falls into the slurry pool below, and large particles failed to pass through are carried forward, are flushed by means of steam spray, are crushed after falling into a crusher, and then return to the hopper to prepare the slurry again;

the oil slurry prepared by the integrative machine enters the oil removal machine under the push of a pump for an oil removal operation; according to the properties of the oil sludge and the working temperature of a demulsifier, the oil slurry in the oil removal machine is heated by a steam member; the steam heating is stopped when a set temperature is reached; the demulsifier is injected quantitatively by means of the three-phase agent addition device; a micro-nano gas source is introduced for stirring; after stirring uniformly, the gas supply is stopped, and the oil slurry stands still; without interference from an external force, under a cracking action of the demulsifier and micro-nano bubbles, the water-in-oil structure is crushed, and the oil, water, and sediment respectively enter a free state; the micro-nano bubbles are adsorbed on surfaces of crude oil particles to increase the buoyancy of heavy crude oil and float up to the surface of water together with the crude oil, the sediment sinks under the action of gravity, so that an oil content of the oil sludge is reduced to 3 percent to 5 percent after treatment from 10 percent to 30 percent before treatment;

the stench generated when the oil sludge is heated by the oil removal machine is collectively extracted and conveyed to a deodorization tower for treatment and then discharged after reaching the standard;

after the oil is collected by the oil removal machine, the remaining water and sediment are discharged into the separation machine; the air flotation member is started to stir the sediment at the bottom of the pool using high-pressure gas, so as to form a suspension liquid with water, and then the suspension liquid is conveyed to the separation machine by the pump to perform a solid-liquid separation operation;

after the sludge after oil removal is mixed with the flocculant in the separation machine, the solid substance sinks under the action of gravity, and the water is discharged along an upper outlet; the sediment at the lower portion is pushed by a screw feeder into a centrifuge, under the action of the high-speed centrifuge, the water in the sediment is further removed, and the remaining sludge is conveyed to the sludge collection tank; the water is discharged from a water outlet to a sewage plant;

during movement from an outlet of the centrifuge to the sludge collection tank, the sludge is added with a dispersant quantitatively and mixed with the dispersant so as to prevent the sludge entering the sludge collection tank from easily agglomerating; the screw feeder at the bottom is configured to feed the sludge to the dewatering machine quantitatively and is in a sealed connection transmission with the dewatering machine and the pyrolysis machine by means of a discharge screw at the bottom of the sludge collection tank; the working temperature in the heat exchanger of the dewatering machine is between 200° C. and 300° C., so that the water in the oil sludge is evaporated, and the water content of the dried oil sludge is reduced by 30 percent to 50 percent; the water in the oil sludge is evaporated and conveyed to the condenser; the dry sludge enters the pyrolysis machine for pyrolysis;

the working temperature in the heat exchanger of the pyrolysis machine is between 550° C. and 650° C.; the grease, moisture and/or plastic in the sludge entering the pyrolysis machine are vaporized and evaporated, and are conveyed to the condenser by means of pipelines, and after reaching the standard, the remaining clinkers are mixed with a curing agent and then coagulate for making bricks; and the crude oil separated by the oil removal machine is stored in the crude oil tank; gasoline and/or diesel oil separated by the separator is stored in a light oil tank; and the sewage separated by the separator is conveyed to the sewage plant.

Obviously, the embodiments above are examples for clearly describing, rather than limiting the embodiments. On the basis of the foregoing description, a person of ordinary skill in the art can also make other different types of changes or modifications. It is neither necessary nor possible to describe all embodiments. Any obvious change or modification derived therefrom shall be included within the scopes of protection of the present invention.

The invention claimed is:

1. An oil sludge treatment system, comprising: an integrative device configured to process oil sludge, an oil removal device configured to remove crude oil from oil slurry and connected to the integrative device, a separation device configured to perform a solid-liquid separation operation and connected to the oil removal device, a sludge collection tank configured to temporarily store sediment from the separation device and connected to the separation device, a dewatering device configured to evaporate water and connected to, a pyrolysis device configured to convey pyrolysis gas and connected to the dewatering device, an agent tank for storing an agent connected to the oil removal device, a deodorization tower configured to treat stench and connected to the oil removal device, a crude oil tank configured to store crude oil, a light oil tank configured to store one or more liquids and connected to the oil removal device, wherein the one or more liquids are selected from the group consisting of gasoline and diesel, a separator configured to separate the one or more liquids, a condenser configured to discharge a condensate and connected to the pyrolysis device, a desulfurization tower connected to the condenser, a clean water tank configured to provide a water source for the integrative device, a sewage station configured to receive sewage and connected to the oil removal device, the separation device, the separator and the clean water tank, and a steam boiler configured to provides a heat source for the integrative device and the oil removal device; wherein an outlet of the integrative device is connected to an inlet of the oil removal device; the oil removal device collects the crude oil to the crude oil tank, discharges stench into the deodorization tower, and discharges the slurry into the separation device; the agent tank is connected to the oil removal device; the separation device is configured to discharge sludge into the sludge collection tank, and to discharge the sewage into the sewage station; the sludge collection tank is configured to feed the dewatering device; the dewatering device is configured to convey the evaporated water into the condenser and convey dry sludge into the pyrolysis device; the pyrolysis device is configured to convey the pyrolysis gas into the condenser; the condenser is configured to discharge the condensate into the separator; an outlet of the separator is connected to the sewage station and the light oil tank, separately; an inlet of the desulfurization tower is connected to the condenser, and an outlet of the desulfurization tower is connected to a steam boiler that is connected to the clean water tank; and the clean water tank is configured to provide a water source the steam boiler.

2. The oil sludge treatment system according to claim 1, wherein the separation device comprises a flocculation zone configured to mix sludge with a flocculant, and a high-speed centrifuge configured to remove water from sediment;

after the sludge after oil removal is mixed with the flocculant in the flocculation zone, a solid substance sinks under the action of gravity, and water is discharged along an upper outlet;

the sediment at the bottom is pushed by a screw feeder into the high-speed centrifuge; and under the action of the high-speed centrifuge, the water in the sediment is further removed, and the remaining sludge is conveyed to the sludge collection tank.

3. The oil sludge treatment system according to claim 1, wherein the sludge collection tank is configured to store sediment from the separation device; during movement from an outlet of the centrifuge to the sludge collection tank, the sediment is added quantitatively with a dispersant and mixed with the dispersant so as to prevent the sludge entering the sludge collection tank 4 from easily agglomerating; and the screw feeder is disposed at the bottom of the sludge collection tank, is configured to feed the dewatering device 5, and is in a sealed connection transmission with the dewatering device 5 and the pyrolysis device 6 by means of a discharge screw at the bottom of the sludge collection tank.

4. The oil sludge treatment system according to claim 1, wherein the dewatering device is provided with consists of a burner and a heat exchanger; the heat exchanger is provided with a screw shaft for moving and tumbling the sediment; and the working temperature in the heat exchanger of the dewatering device is between 200° C. and 300° C.

5. The oil sludge treatment system according to claim 1, wherein the pyrolysis device is provided with a heat exchanger, and the working temperature in the heat exchanger of the pyrolysis device is between 550° C. and 650° C.

6. The oil sludge treatment system according to claim 1, wherein the agent is selected from the group consisting of a demulsifier, a flocculant, dispersant, and a curing agent.

7. The oil sludge treatment system according to claim 1, wherein disposed within the deodorizing tower is a sprayer which is connected to an alkali solution pump and alkali supply, and wherein the gases into the deodorizer contacted with the alkali solution removes odors from the gases.

8. The oil sludge treatment system according to claim 1, wherein the crude oil tank is configured to store crude oil separated by the oil removal device; the light oil tank is configured to store gasoline and/or diesel separated by the separator; a condensate inlet is provided at an upper portion of the separator, and an outlet is provided at the bottom;

and the outlet is connected to the sewage station and the light oil tank, separately.

9. The oil sludge treatment system according to claim 1, wherein the condenser comprises a dust removal device configured to remove dust.

10. The oil sludge treatment system according to claim 1, wherein a desulfurizer is distributed in the desulfurization tower; a combustible gas inlet is provided at the bottom of the desulfurization tower, and a combustible gas outlet is provided at the top thereof; the combustible gas inlet is connected to the condenser; and the combustible gas outlet is connected to the steam boiler.

* * * * *